United States Patent
Ueno et al.

(10) Patent No.: US 10,268,365 B2
(45) Date of Patent: Apr. 23, 2019

(54) ELECTRONIC APPARATUS, CONTROL METHOD OF ELECTRONIC APPARATUS, AND CONTROL PROGRAM OF ELECTRONIC APPARATUS

(71) Applicant: KYOCERA Corporation, Kyoto-shi, Kyoto (JP)

(72) Inventors: Yasuhiro Ueno, Yokohama (JP); Shigeki Tanabe, Yokohama (JP); Hideki Morita, Yokohama (JP); Isao Masuike, Machida (JP); Atsuo Chiba, Yokohama (JP); Daisuke Ibuki, Yokohama (JP); Daisuke Tsuiki, Tokyo (JP); Sunao Hashimoto, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/024,033

(22) PCT Filed: Sep. 5, 2014

(86) PCT No.: PCT/JP2014/004584
§ 371 (c)(1),
(2) Date: Mar. 23, 2016

(87) PCT Pub. No.: WO2015/045290
PCT Pub. Date: Apr. 2, 2015

(65) Prior Publication Data
US 2016/0231922 A1   Aug. 11, 2016

(30) Foreign Application Priority Data
Sep. 24, 2013   (JP) ................................ 2013-197399

(51) Int. Cl.
*G06F 3/041*   (2006.01)
*G06F 3/045*   (2006.01)
(Continued)

(52) U.S. Cl.
CPC ........ *G06F 3/04883* (2013.01); *G06F 1/1694* (2013.01); *G06F 1/3215* (2013.01);
(Continued)

(58) Field of Classification Search
CPC ..... G06F 3/0416; G06F 3/044; G06F 3/04883
See application file for complete search history.

(56) References Cited

U.S. PATENT DOCUMENTS

2001/0043188 A1* 11/2001 Nakamura ............ G06F 1/1626
345/102
2010/0164909 A1   7/2010 Momono
(Continued)

FOREIGN PATENT DOCUMENTS

JP   2008-176641 A   7/2008
JP   2010-152682 A   7/2010
(Continued)

OTHER PUBLICATIONS

Office Action in JP Application No. 2013-197399, dated Jun. 2, 2015.
(Continued)

*Primary Examiner* — Nan-Ying Yang
(74) *Attorney, Agent, or Firm* — Hauptman Ham, LLP (57) ABSTRACT

An electronic apparatus that may be enabled by a user's simple operation to a touch panel, a control method of the electronic apparatus, and a control program of the electronic apparatus are provided. An electronic apparatus includes a contact detector for detecting a contact, an acceleration detector for detecting acceleration, a display for displaying an image, and controllers for controlling, when the acceleration detector detects predetermined acceleration caused by a first tap and, within a predetermined period therefrom, the contact detector detects a contact caused by a second touch, to carry out an operation based on the contact.

12 Claims, 4 Drawing Sheets

(51) Int. Cl.
  *G06F 3/0488*   (2013.01)
  *G06F 1/16*     (2006.01)
  *G06F 3/0346*   (2013.01)
  *G06F 1/3215*   (2019.01)
  *G06F 1/3231*   (2019.01)
  *G06F 1/3234*   (2019.01)
  *G06F 3/01*     (2006.01)
  *H04W 52/02*    (2009.01)

(52) U.S. Cl.
  CPC .......... *G06F 1/3231* (2013.01); *G06F 1/3265* (2013.01); *G06F 3/017* (2013.01); *G06F 3/0346* (2013.01); *G06F 3/0416* (2013.01); *H04W 52/027* (2013.01); *H04W 52/0254* (2013.01); *H04W 52/0274* (2013.01); *H04W 52/0293* (2013.01); *G06F 2200/1636* (2013.01); *G06F 2203/0381* (2013.01); *G06F 2203/04104* (2013.01); *G09G 2330/022* (2013.01); *Y02D 10/153* (2018.01); *Y02D 10/173* (2018.01)

(56) References Cited

U.S. PATENT DOCUMENTS

| | | | |
|---|---|---|---|
| 2010/0313125 A1 | 12/2010 | Fleizach et al. | |
| 2011/0074710 A1* | 3/2011 | Weeldreyer | G06F 3/0481 345/173 |
| 2011/0242043 A1 | 10/2011 | Yarvis et al. | |
| 2012/0154292 A1 | 6/2012 | Zhao et al. | |
| 2012/0286944 A1* | 11/2012 | Forutanpour | G06F 3/04847 340/407.1 |
| 2013/0100044 A1 | 4/2013 | Zhao et al. | |
| 2013/0257923 A1* | 10/2013 | Choi | G09G 3/32 345/690 |
| 2014/0009461 A1* | 1/2014 | Dai | G06F 3/04815 345/419 |
| 2014/0062914 A1* | 3/2014 | Lin | G06F 3/0485 345/173 |
| 2014/0189397 A1 | 7/2014 | Kanai | |
| 2015/0026613 A1* | 1/2015 | Kwon | G06F 3/04886 715/764 |

FOREIGN PATENT DOCUMENTS

| | | |
|---|---|---|
| JP | 2010-251844 A | 11/2010 |
| JP | 2010-262463 A | 11/2010 |
| JP | 2011-233142 A | 11/2011 |
| JP | 2012-221435 A | 11/2012 |
| JP | 2013-44778 A  | 3/2013 |
| JP | 2013-135239 A | 7/2013 |
| WO | 2010/144201 A2 | 12/2010 |

OTHER PUBLICATIONS

Office Action in JP Application No. 2013-197399, dated Sep. 1, 2015.
Office Action in JP Application No. 2013-197399, dated Dec. 8, 2015.
International Search Report in PCT/JP2014/004584, dated Oct. 7, 2014.
Written Opinion of the International Searching Authority in PCT/JP2014/004584, dated Oct. 7, 2014.
Office Action in JP Application No. 2013-197399, dated Sep. 27, 2016.
Quick Launch lockscreen, Appllio—Android—[online], Updated on Apr. 20, 2012, [retrieved on Aug. 17, 2017]. Retrieved from the Internet:<URL: https://web.archive.org/web/20120422055203/http://appllio.com/android-customize-app/20120420-1999-quick-launch-lockscreen>. 7pp.
Office Action in JP Application No. 2016-229053, dated Aug. 29, 2017, 4pp.
Extended European Search Report in EP Application No. 14850069.7, dated Apr. 11, 2017.

* cited by examiner

FIG. 4

ELECTRONIC APPARATUS, CONTROL METHOD OF ELECTRONIC APPARATUS, AND CONTROL PROGRAM OF ELECTRONIC APPARATUS

CROSS REFERENCE TO RELATED APPLICATION

This application is a National Phase of International Application Number PCT/JP2014/004584, filed Sep. 5, 2014, and claims priority to and the benefit of Japanese Patent Application No. 2013-197399 filed on Sep. 24, 2013, the entire contents of which are incorporated herein by reference.

TECHNICAL FIELD

This disclosure relates to an electronic apparatus, a control method of the electronic apparatus, and a control program of the electronic apparatus. In particular, this disclosure relates to an electronic apparatus having a touch panel, a control method for such an electronic apparatus, and a program for controlling such an electronic apparatus.

BACKGROUND

Conventionally, an electronic apparatus driven by a battery such as, for example, a smartphone, from the viewpoint of saving power consumption and the like, is generally set into a sleep mode or shifts to a suspension mode when a user is not operating the electronic apparatus.

In order to cancel the sleep mode or the like and enable the electronic apparatus, the user generally needs to turn on a mechanical switch (a button or the like) disposed on a lateral side or the like of the electronic apparatus (for example, see PLT 1 set forth below).

CITATION LIST

Patent Literature

PLT 1: JP-A-2013-135239

SUMMARY

Technical Problem

In a case where the electronic apparatus has a touch panel, it may be more convenient when a user's operation to the touch panel may enable the electronic apparatus.

It could be helpful to provide an electronic apparatus that may be enabled by a user's simple operation to the touch panel, a control method of the electronic apparatus, and a control program of the electronic apparatus.

Solution to Problem

In order to achieve the above object, an electronic apparatus according to a first aspect includes:
 a contact detector for detecting a contact;
 an acceleration detector for detecting acceleration;
 a display for displaying an image; and
 a controller for controlling, when the acceleration detector detects predetermined acceleration caused by a first tap and, within a predetermined period therefrom, the contact detector detects a contact caused by a second touch, to carry out an operation based on the contact.

The controller, based on the contact, may control to execute corresponding application software.

The controller, based on the contact, may control to change an operation mode of the electronic apparatus.

The controller, based on the contact, may control to change a predetermined setting of the electronic apparatus.

The controller may control to carry out an operation based on at least one of a position, a mode, and the number of contacts.

The controller, when the contact detector simultaneously detects contacts at a plurality of positions caused by the second touch, may determine the number of the contacts and control to carry out an operation based on the number of the contacts.

The controller may control to carry out an operation based on the number of times the acceleration detector detects the predetermined acceleration.

In order to achieve the above object, a control method of an electronic apparatus according to a second aspect includes:
 a contact detection step of detecting a contact;
 an acceleration detection step of detecting acceleration;
 a display step of displaying an image; and
 a control step of controlling, when predetermined acceleration caused by a first tap is detected at the acceleration detection step and, within a predetermined period therefrom, a contact caused by a second touch is detected at the contact detection step, to carry out an operation based on the contact.

In order to achieve the above object, a control program of an electronic apparatus according to a third aspect having a contact detector for detecting a contact, an acceleration detector for detecting acceleration, and a display for displaying an image, wherein
 the control program controls, when the acceleration detector detects predetermined acceleration caused by a first tap and, within a predetermined period therefrom, the contact detector detects a contact caused by a second touch, to carry out an operation based on the contact.

Advantageous Effect

According to our electronic apparatus, control method of the electronic apparatus, and control program of the electronic apparatus, the electronic apparatus may be enabled by a user's simple operation to a touch panel.

DETAILED DESCRIPTION

Hereinafter, an embodiment of the disclosure will be described with reference to the accompanying drawings.

Figure 1:
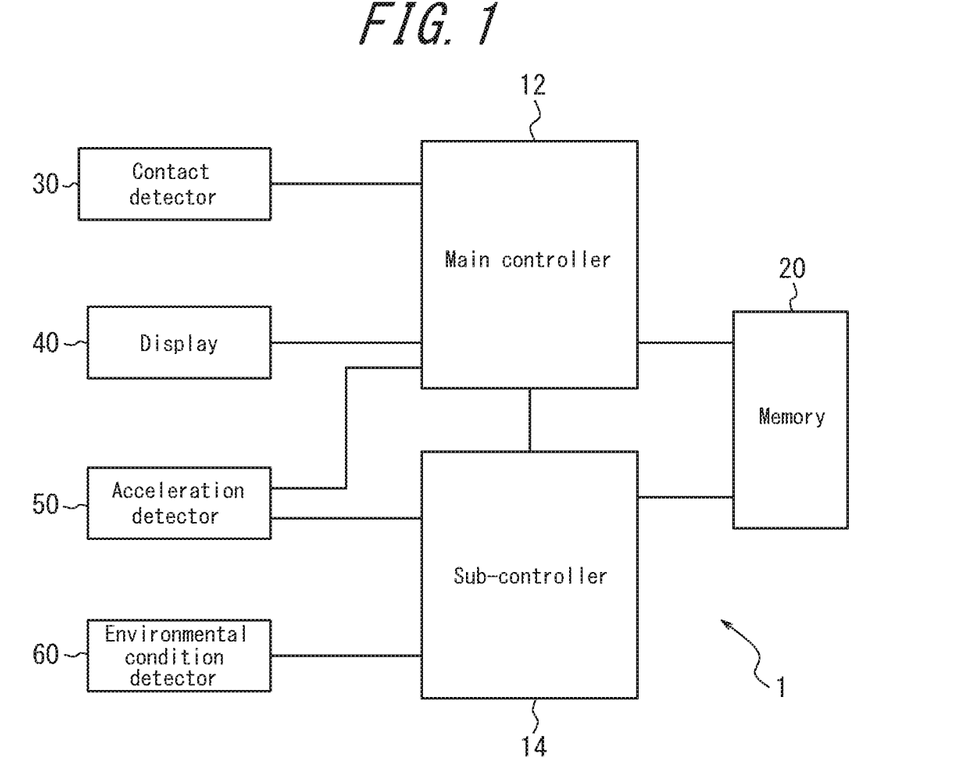
FIG. 1 is a functional block diagram schematically illustrating an electronic apparatus according to an embodiment of the disclosure herein.

FIG. 1 is a functional block diagram schematically illustrating an electronic apparatus according to an embodiment.

Hereinafter, the electronic apparatus according to the disclosure herein is assumed to be a mobile device such as, for example, a smartphone. However, the disclosure herein is not limited to the mobile device such as the smart phone but is applicable to various electronic apparatuses such as, for example, a mobile phone, a tablet PC, a laptop computer and the like, as well as electronic apparatuses those are not necessarily carried.

As illustrated in FIG. 1, an electronic apparatus 1 includes a main controller 12, a sub-controller 14, a memory 20, a contact detector 30, a display 40, and an acceleration detector 50. As illustrated in FIG. 1, the electronic apparatus 1 may further include an environmental condition detector 60.

The main controller 12 controls the electronic apparatus 1. The main controller 12 may be constituted by using, for example, a processor. The main controller 12, in operation, controls and manages the entire electronic apparatus 1 including the sub-controller 14, the contact detector 30, the display 40, and the acceleration detector 50. Note that, when the main controller 12 is in operation, the sub-controller 14 may perform a part of the overall control and management of the electronic apparatus 1 in a manner independent from the main controller 12. According to the present embodiment, the main controller 12 mainly controls the contact detector 30 to detect a contact and the display 40 to display an image.

The sub-controller 14 partially controls function units constituting the electronic apparatus 1. The sub-controller 14 may be constituted by using, for example, a co-processor. The sub-controller 14 mainly controls the acceleration detector 50 to detect acceleration. The sub-controller 14 may also control the environmental condition detector 60 to detect an environmental circumstance as described later. The sub-controller 14 may control those units under control of the main controller 12.

Although in FIG. 1 the main controller 12 and the sub-controller 14 are constituted by using individual components, one controller may carry out both the operation of the main controller 12 and the operation of the sub-controller 14. Hereinafter, the main controller 12 and the sub-controller 14 are collectively referred to as "controllers (12 and 14)" in an appropriate manner.

The memory 20 may be constituted by using, for example, a NAND-type flash memory or the like. The memory 20 may store various types of application software (hereinafter, simply referred to as "applications") to be executed in the electronic apparatus 1, as well as various information. According to the present embodiment, in particular, the memory 20 may store information such as the progress and results of the operations carried out by the main controller 12 and the sub-controller 14. According to the present embodiment, the memory 20 may also store information such as results of detection by the detectors under control of the main controller 12 and the sub-controller 14.

The contact detector 30 detects a contact by a user's finger, a stylus pen and the like and may be constituted by using, for example, a touch sensor or a touch panel. The contact detector 30 constituted by using the touch sensor or the touch panel may be of, for example, a resistive type, a capacitive type, an optical type, or the like. The contact detector 30 detects a contact thereto under the control of the main controller 12. The contact detector 30, when detecting the contact, outputs a detection signal to the main controller 12. The main controller 12, based on the detection signal, may know a position of the contact detected in the contact detector 30. Note that the contact detector 30 may detect the contact under the control of the sub-controller 14.

According to the present embodiment, the contact detector 30 may record, as a contact history, a contact detected while in operation and receiving power supply received from the main controller 12 even after the contact is no longer detected. The contact history recorded by the contact detector 30 may be deleted under the control of the main controller 12. Further, when the power is no longer supplied from the main controller 12, the contact detector 30 cannot maintain the record, and the contact history that has been recorded is deleted.

The display 40 may be constituted by using a display device such as a liquid crystal display (LCD), an organic EL display, an inorganic EL display, and the like. The display 40 is usually placed on a rear side of the contact detector 30 that transmits light. Since the display 40 is placed on the rear side of the contact detector 30, a contact to an object or the like depicted in an image on the display 40 is detected at a corresponding position on the contact detector 30. The display 40 may display various images including characters and graphics. Also, the display 40 may display an image depicting an object of a push-button switch (push-type button switch), such as, for example, a key. This object is an image indicating, to the user, a region of the contact detector 30 where the user should contact. When the display 40 is constituted by using the LCD and displaying the image, the display 40 may be lit up by backlight or the like such that the image may be easily viewed. In this case, the main controller 12 may control such that the backlight is turned on upon activation of the display 40 in an interlocking manner, or control to turn on the backlight separately.

The acceleration detector 50 detects the acceleration and may be constituted by using, for example, an inertial sensor such as an acceleration sensor employing an electrostatic capacitance detection method. Such an acceleration sensor may also detect gravitational force applied to the sensor and, by appropriately processing a detected signal, may determine an inclination of the acceleration sensor. Such an acceleration sensor may also detect a movement of the sensor and, by appropriately processing a detected signal, may obtain information such as applied shock and vibration. Therefore, when the acceleration detector 50 is provided inside a body of the electronic apparatus 1 or the like, the electronic apparatus 1 may obtain information such as the inclination (relative to a vertical direction serving as a reference) of the electronic apparatus 1, as well as shock and vibration applied to the electronic apparatus 1.

The acceleration detector 50, under control of at least one of the main controller 12 and the sub-controller 14, detects the acceleration applied to the electronic apparatus 1. The acceleration detector 50, when detecting the acceleration, outputs a detection signal to at least one of the main controller 12 and the sub-controller 14. With the detection signal, the main controller 12 and the sub-controller 14 may know the acceleration applied to the electronic apparatus 1.

The environmental condition detector 60 may be constituted by using various types of sensors such as an air pressure sensor for detecting an ambient atmospheric pressure, a UV sensor for detecting ambient ultraviolet radiation, a proximity sensor for detecting proximity of an object existing around, a humidity sensor for detecting ambient humidity, a temperature sensor for detecting temperature, and the like. Or, the environmental condition detector 60 may be constituted by using a CCD image sensor, a GPS signal receiver or the like. The environmental condition detector 60 may be any detection means as long as serving to detect the environmental condition of the electronic apparatus 1. The sub-controller 14 and the main controller 12, according to the environmental condition detector 60 that is installed, may obtain the environmental condition of the electronic apparatus 1.

When, for example, an input operation by the user is not detected, the main controller 12 may shift the electronic apparatus 1 to a sleep mode or a suspension mode. Here, the sleep mode according to the present embodiment includes a state of restricting some functions of the electronic apparatus 1 such as, for example, displaying no image in the display 40. Note that the sleep mode includes, when the display 40 is constituted by using the LCD, a state in which the LCD is depicting the image while the backlight is turned off. According to the present embodiment, the suspension mode includes states of restricting some functions of the electronic apparatus 1 such as, for example, a state in which the contact detector 30 is not detecting a contact, a state in which the main controller 12 is suspended, and a state in which the main controller 12 is not activated and waiting for an activation instruction. The main controller 12, by shifting the electronic apparatus 1 to the sleep mode or suspension mode, may reduce the power consumption of the electronic apparatus 1 as compared to that of the electronic apparatus 1 in a usual activated state. In the sleep mode and the suspension mode as described above, usually, some or all of the operations carried out by the main controller 12 are restricted.

Figure 2:
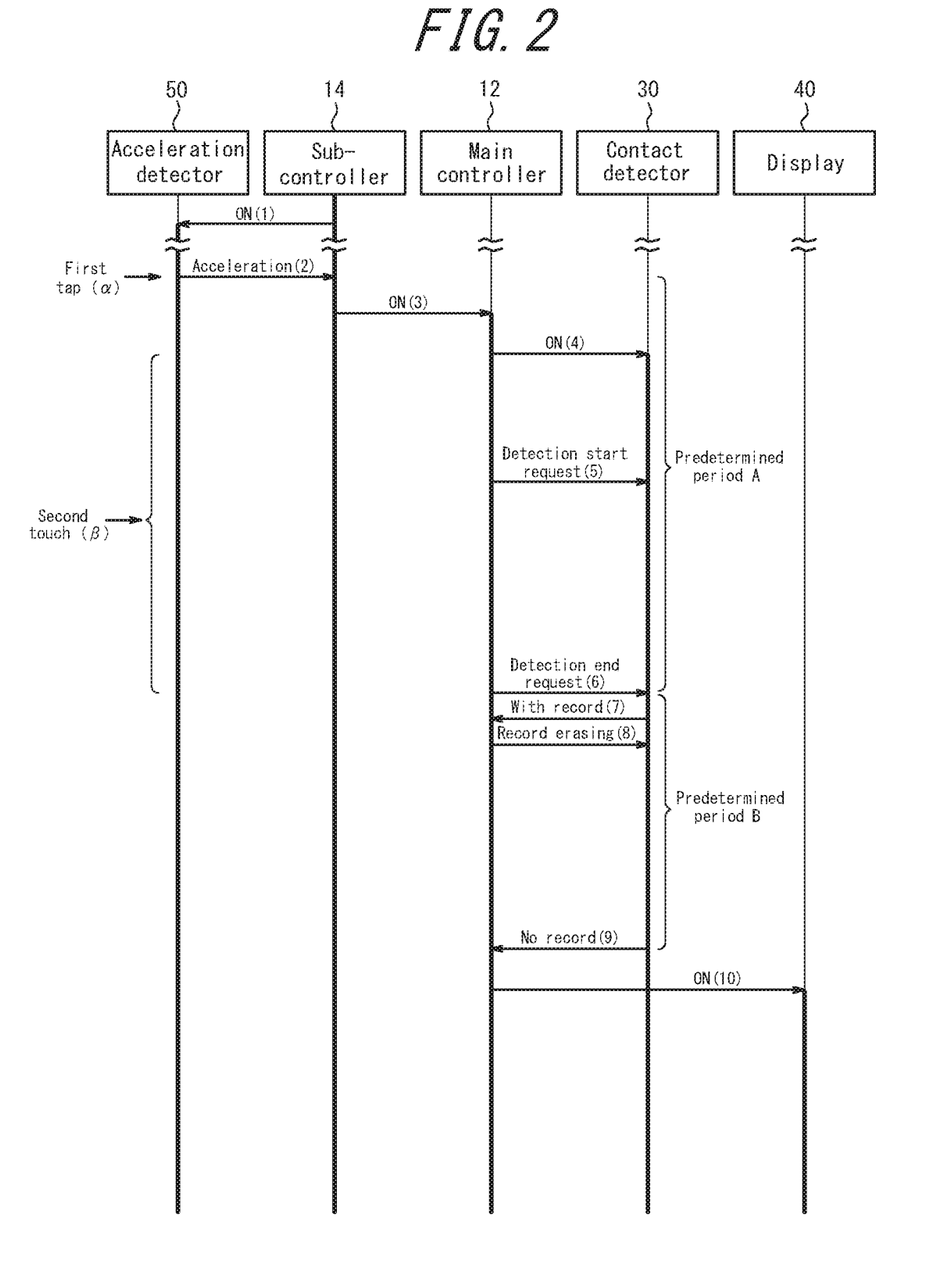
FIG. 2 is a sequence diagram illustrating an operation of the electronic apparatus according to the embodiment.
Figure 3:
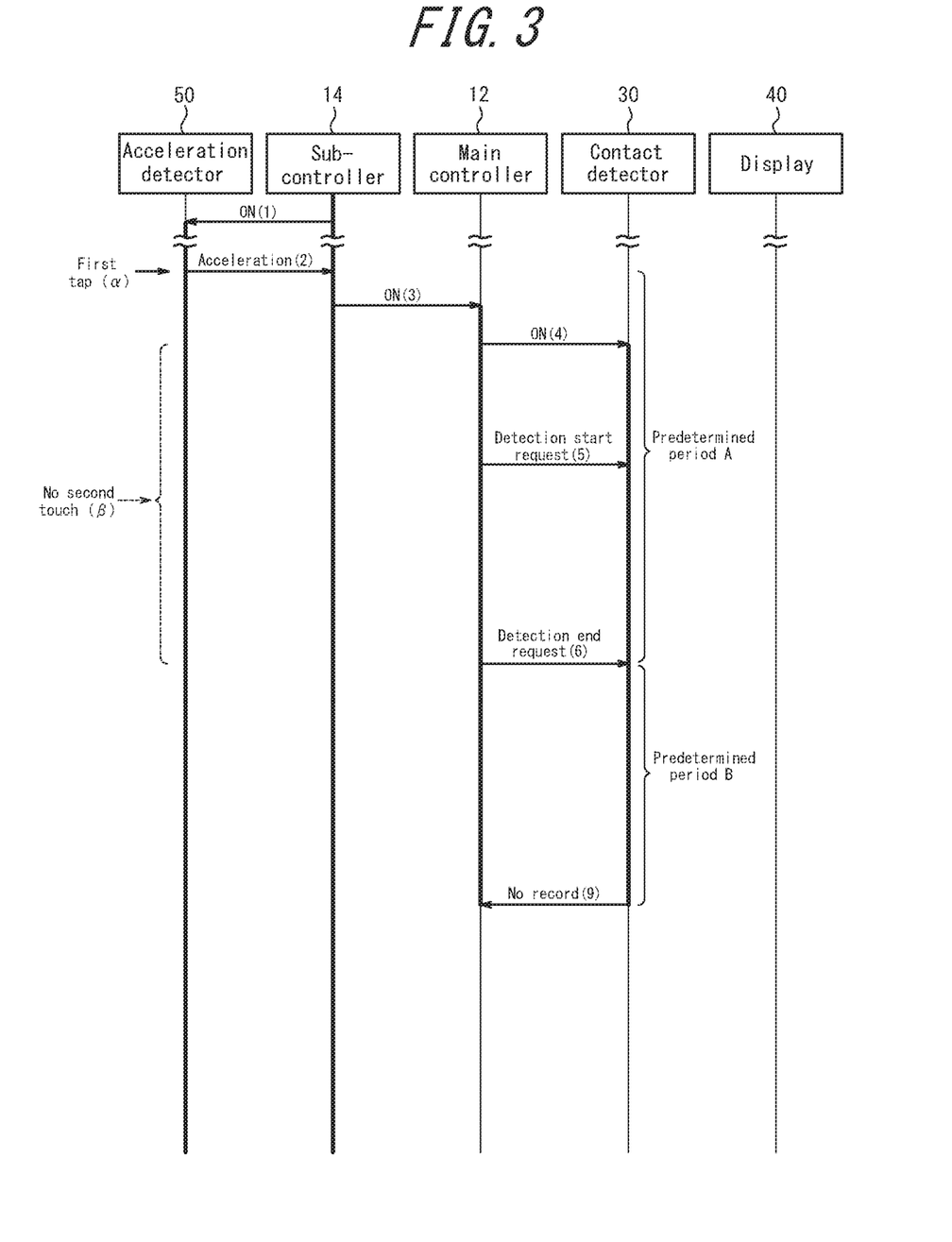
FIG. 3 is a sequence diagram illustrating another operation of the electronic apparatus according to the embodiment.
Figure 4:
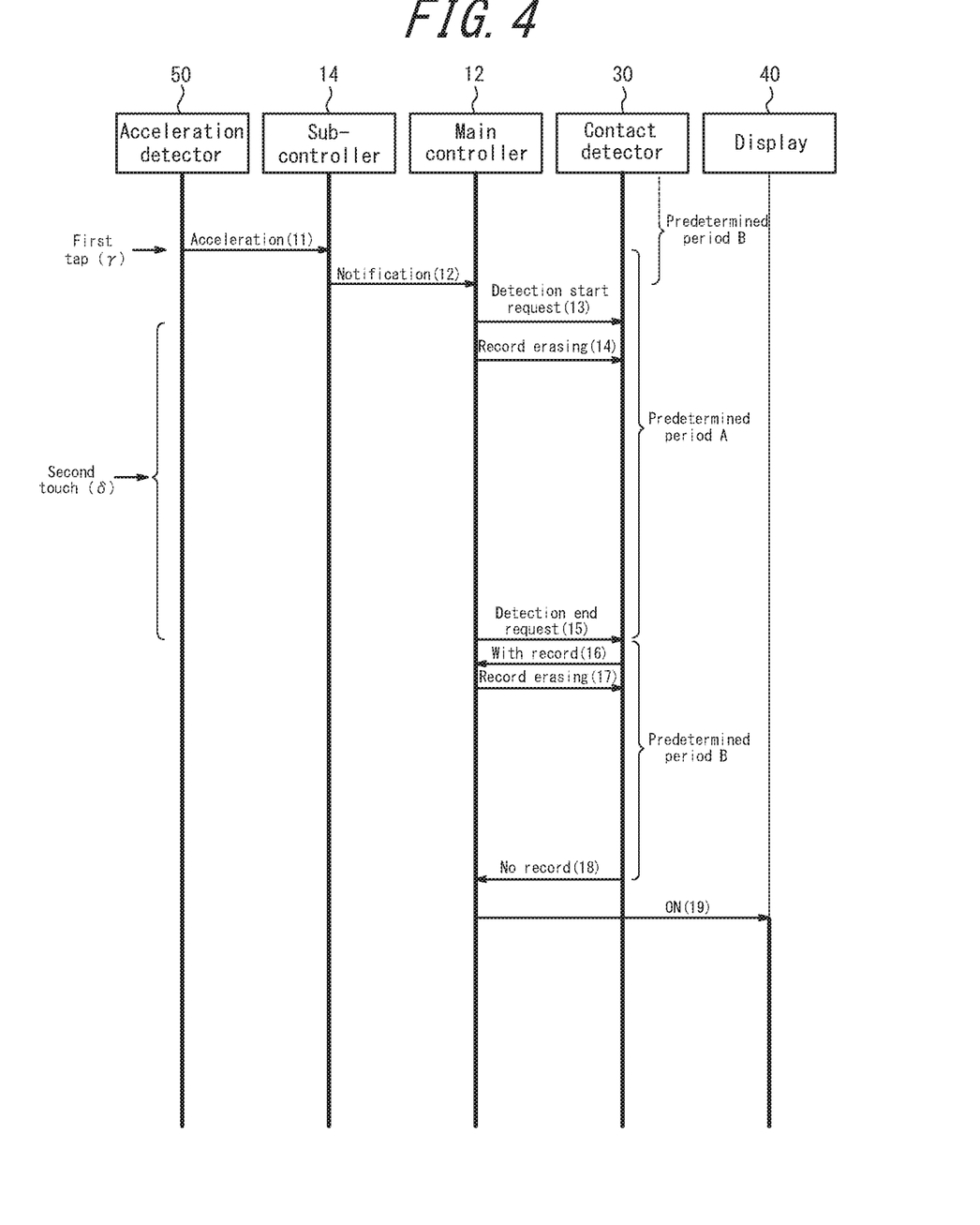
FIG. 4 is a sequence diagram illustrating yet another operation of the electronic apparatus according to the embodiment.

Next, an operation of the electronic apparatus 1 according to the present embodiment will be described. FIG. 2 to FIG. 4 are diagrams illustrating operations of main components constituting the electronic apparatus 1.

FIG. 2 is a diagram illustrating a state in which, since the electronic apparatus 1 in the suspension mode has detected a sequential operation of a tap operation and a touch operation by the user, the electronic apparatus 1 cancels the suspension mode thereof and the display 40 displays an image. According to the present embodiment, the "sequential operation" means a first operation and a second operation that is carried out within a predetermined period from the first operation. Here, preferably, the predetermined period is a relatively short time such as, for example, 0.5 second.

According to the present embodiment, when the electronic apparatus 1 detects the sequential operation to the contact detector 30 by the user, the suspension mode, for example, of the electronic apparatus 1 is cancelled, and the electronic apparatus 1 is enabled. According to the present embodiment, the electronic apparatus 1 is "enabled" means that, in particular, the display 40 starts displaying the image. Viewing the display, the user may carry out a next operation to the electronic apparatus 1.

According to the present embodiment, in detection of the sequential operation by the user, the tap of the first time (a first tap) is detected by the acceleration detector 50, and the following second touch (a second touch) is detected by the contact detector 30.

Since the sequential operation is detected as described above, the main controller 12 of the electronic apparatus 1 originally in the suspension mode may be set not to be activated before the detection of the first tap. Also, the contact detector 30 may be set not to be activated before the first tap. Therefore, the electronic apparatus 1 according to the present embodiment, as compared with a case where the main controller 12 and the contact detector 30 are activated all the time, may significantly reduce the power consumption.

When the sequential operation is detected by the acceleration detector 50 alone, there is a risk that small oscillations applied to the electronic apparatus 1 being carried in, for example, a bag are erroneously detected as the sequential operation. According to the present embodiment, however, the second touch is detected by the contact detector 30 as described above. Unless the user actually contacts the contact detector 30 for the second touch, the display 40 refrains from displaying the image. According to the present embodiment, therefore, when small oscillations are applied to the electronic apparatus 1 as described above, such oscillations are not erroneously detected as the sequential operation. Accordingly, the electronic apparatus 1 does not wastefully consume the power by meaninglessly displaying the image on the display 40.

In the electronic apparatus 1 according to the present embodiment, the acceleration detector 50 detects the acceleration all the time. Therefore, when the electronic apparatus 1 detects the sequential operation, the sub-controller 14 for controlling the acceleration detector 50 needs to be activated such that the acceleration detector 50 may detect the acceleration.

As illustrated in FIG. 2, when the electronic apparatus 1 according to the present embodiment detects the sequential operation, first, the sub-controller 14 activates the acceleration detector 50 (ON (1)). Thereby, the electronic apparatus 1 becomes ready to detect the first tap.

A timing when, after the activation of the acceleration detector 50, the user performs the first tap by contacting the contact detector 30 or the like is referred to as a first tap (α) in FIG. 2. When detecting the acceleration, the acceleration detector 50 transmits the acceleration to the sub-controller 14 (Acceleration (2)).

Here, as described above, since the first tap is detected by the acceleration detector 50, the user does not necessarily need to contact the contact detector 30 but may tap in any manner applying the acceleration to the acceleration detector 50. That is, the user may perform the first tap at any portion in the electronic apparatus 1. Also, the user, when the electronic apparatus 1 is placed on a desk or the like, may perform the first tap to a portion of the desk near the electronic apparatus 1. Even when the tap is performed to the portion of the desk near the electronic apparatus 1 in this manner, an impact of the tap is delivered to the electronic apparatus 1 placed on the desk, and the acceleration detector 50 may detect the acceleration.

When the sub-controller 14 receives the acceleration detected by the acceleration detector 50, the sub-controller 14 determines whether the received acceleration is predetermined acceleration caused by the first tap. When the received acceleration is the predetermined acceleration caused by the first tap, the sub-controller 14 activates the main controller 12 (ON (3)). That is, the sub-controller 14, instead of activating the main controller 12 regardless of a pattern of the acceleration detected by the acceleration detector 50, activates the main controller 12 only when the acceleration detector 50 detects acceleration in a characteristic pattern caused by the first tap. Therefore, the sub-controller 14 needs to know the characteristic pattern of the acceleration (for example, a changing pattern of the acceleration and the like) caused by the first tap.

Since there may be various patterns of the acceleration according to conditions of the electronic apparatus 1, the characteristic patterns of the acceleration detected in the conditions will be preliminarily prepared. For example, there may be prepared a pattern of the acceleration caused when the user holds the electronic apparatus 1 in one hand and taps the electronic apparatus 1 with a finger of the other hand, and a pattern of the acceleration caused when the user taps the electronic apparatus 1 placed on the desk or the like. Such patterns of the acceleration may be stored in the sub-controller 14, or stored in the memory 20 and retrieved therefrom. The characteristic patterns of the acceleration caused by the tap may be preliminarily stored, or learned by the sub-controller 14 from the taps performed by the user.

The characteristic acceleration pattern caused by the first tap may be, for example, when the acceleration detector 50 is capable of detecting the acceleration in each direction of x, y, and z axes, a pattern in which the acceleration in a normal direction of a surface of the contact detector 30, to which the user performs the sequential operation, sharply changes.

In this manner, the sub-controller 14 determines whether the acceleration detector 50 has detected the predetermined acceleration caused by the first tap. When the sub-controller 14 determines that the detected acceleration is the predetermined acceleration caused by the first tap, the sub-controller 14 activates the main controller 12 (ON (3)). When the main controller 12 is activated, the electronic apparatus 1 shifts from the suspension mode to the sleep mode. The moment when the main controller 12 is activated, a request that the contact detector 30 start detecting a contact cannot be issued. According to the present embodiment, therefore, upon activation of the main controller 12, the contact detector 30 is also activated (ON (4)). Then, the contact detector 30 detects a contact without waiting for a Detection start request (5) from the main controller 12 and operates to maintain the contact history.

In FIG. 2, after a short while from the activation of the main controller 12 (ON (3)), the Detection start request (5) is transmitted, followed by a Detection end request (6). When the contact detector 30 waits for the Detection start request (5) from the main controller 12, the contact detector 30 may detect a contact only between the Detection start request (5) and the Detection end request (6). In this case, however, when a time interval between the user's first tap and the second touch is short, there may be a risk that the second touch cannot be detected. Therefore, according to the present embodiment, as described above, the contact detector 30 detects a contact without waiting for the Detection start request (5) from the main controller 12 and operates to record the contact with the contact history. According to the present embodiment, therefore, the contact detector 30 may detect the contact between the ON (4) of the main controller 12 and the Detection end request (6).

According to the present embodiment, as described above, upon activation of the main controller 12, the contact detected by the contact detector 30 is recorded with the contact history. Before activation of the main controller 12, since the contact detector 30 is not receiving power supply from the main controller 12 and thus not activated, the contact detector 30 is capable of neither recording the contact with the contact history nor maintaining the contact history. According to the present embodiment, therefore, when the main controller 12 is not activated at the time of the detection of the predetermined acceleration caused by the first tap, the contact detector 30 may detect the contact without erasing the contact history.

In FIG. 2, it is assumed that the user performs the second touch ((3) between ON (4) and the Detection end request (6). Therefore, the contact detector 30 detects the contact caused by the second touch between the ON (4) and the Detection end request (6). Here, since the contact detector 30 detects the contact caused by the second touch between the ON (4) and the Detection end request (6), the main controller 12 receives a response that there is a record of the contact in the contact history from the contact detector 30 (With record (7)).

The main controller 12, after a predetermined period B following the transmission of the Detection end request (6), determines whether the contact detector 30 has detected a contact. When a new contact is not detected during the predetermined period B, the main controller 12 may determine that there is no touch that follows the second touch (β).

When the main controller 12 receives the response of the "With record (7)" from the contact detector 30, the main controller 12 controls the contact detector 30 to erase the record of the contact in the contact history (Record erasing (8)). Thereby, the contact detector 30 may determine whether there is the new contact during the predetermined period B. In FIG. 2, the contact detector 30 does not detect the new contact during the predetermined period B. Therefore, the main controller 12 receives, from the contact detector 30, a response that there is no record of a contact in the contact history (No record (9)).

After receiving the response that there is no record of the contact from the contact detector 30, the main controller 12 determines that the second touch is performed within the predetermined period (the predetermined period A) from the first tap, that is, determines that the sequential operation is successfully performed, and activates the display 40 (ON (10)) to start displaying the image. According to the present embodiment, that is, when the contact detector 30 detects the contact caused by the second touch within the predetermined period after the acceleration detector 50 detects the predetermined acceleration caused by the first tap, the controllers (12 and 14) control the display 40 to start displaying the image.

Here, the sub-controller 14 controls the acceleration detector 50 to detect the acceleration and, when the acceleration detector 50 detects the predetermined acceleration caused by the first tap, controls to activate the main controller 12. Also, the main controller 12 controls the contact detector 30 to detect a contact and, when the contact detector 30 detects the contact caused by the second touch, controls the display 40 to start displaying the image.

Although according to the present embodiment the main controller 12 controls the contact detector 30, the sub-controller 14 may control the contact detector 30. When the sub-controller 14 controls the contact detector 30, after the electronic apparatus 1 detects the second touch, the sub-controller 14 may activate the main controller 12 so as to control the display 40 to display the image. The electronic apparatus 1 having a configuration as described above may further reduce the power consumption of the main controller 12.

FIG. 3 is a diagram illustrating an operation carried out by the electronic apparatus 1 when the first tap (α) is detected similarly to FIG. 2 but the second touch (β) is not detected.

As illustrated in FIG. 3, within the predetermined period A after the acceleration detector 50 detects the predetermined acceleration caused by the first tap, the contact detector 30 does not detect the contact caused by the second touch. In this case, it is assumed that the user performed the first tap but did not perform the second touch successively, or that the user did not performed the first tap but, due to some vibration, the first tap is erroneously detected.

In this case also, the main controller 12, after transmitting the Detection end request (6), receives the response that there is no record of the contact in the contact history from the contact detector 30 (No record (9)).

In FIG. 3, the contact detector 30 does not detect the contact caused by the second touch between the ON (4) and the Detection end request (6). Therefore, the main controller 12 receives the response that there is no record of the contact in the contact history from the contact detector 30 (No record (9)).

When receiving the response that there is no record of the contact from the contact detector 30, the main controller 12 determines that the second touch is not performed within the predetermined period (the predetermined period A) from the first tap, that is, determines that the sequential operation was not successfully performed and refrains from activating the display 40 (ON (10)). In this case, the display 40 does not start displaying the image.

When there is the first tap but there is no second touch, the electronic apparatus 1 considers that the first tap was erroneously detected. The electronic apparatus 1, after a period of time longer than the predetermined period B, suspends the main controller 12 again and shifts into the suspension mode. The main controller 12, before being suspended, may turn off and disable the contact detector 30.

According to the electronic apparatus 1 of the present embodiment, as described above, when the acceleration detector 50 detects the predetermined acceleration and, within the predetermined period therefrom, the contact detector 30 does not detect the contact, the display 40 does not start displaying the image. According to the present embodiment, therefore, unless the user performs the sequential operation, the electronic apparatus 1 is not enabled. According to the present embodiment, also, when the electronic apparatus 1 erroneously detects the first tap upon detection of the predetermined acceleration, the electronic apparatus 1 is not enabled unless the contact detector 30 detects the contact caused by the second touch. The electronic apparatus 1 according to the present embodiment, in this manner, may be enabled by a user's simple operation to the touch panel.

The main controller 12, after receiving the response of No record (9), stops the power supply to the contact detector 30. Thereby, the contact detector 30 is turned off and disabled. When the contact detector 30 is turned off and information on the contact history recorded by the contact detector 30 is volatile, the information on the contact history is not retained.

FIG. 4 is a diagram illustrating an operation carried out by the electronic apparatus 1 when the second touch (β) is not detected within the predetermined period A but a next tap is detected within the predetermined period B thereafter.

Operations illustrated in FIG. 3 and FIG. 4 may be carried out in the following situation. That is, for example, the user does not perform an operation for a little while after performing the first tap, and then starts over from the first tap. This may be when the user performs the sequential operation again because the sequential operation performed by the user at first was not appropriately recognized. Or, since the contact caused by the second touch is not detected after the electronic apparatus 1 erroneously detects the first tap upon detection of the predetermined acceleration, the user performs the sequential operation thereafter. Another situation in which the operation illustrated in FIG. 4 is carried out may be when the user is not operating the electronic apparatus 1 and the electronic apparatus 1 is thus in the sleep mode.

The operation illustrated in FIG. 4 starts before an end of the predetermined period B in FIG. 3. In FIG. 4, therefore, different from FIG. 2 and FIG. 3, the acceleration detector 50, the main controller 12, and the contact detector 30 are already activated at the start of the operation illustrated in FIG. 4. However, the display 40 is not displaying the image. At the start of the operation in FIG. 4, the electronic apparatus 1 is in the sleep mode.

As illustrated in FIG. 4, before the end of the predetermined period B continued from FIG. 3, it is assumed that the user performs the first tap (y) by contacting, for example, the contact detector 30. When the acceleration caused by the first tap is detected, the acceleration detector 50 transmits the acceleration to the sub-controller 14 (Acceleration (11)).

When receiving the acceleration detected by the acceleration detector 50, the sub-controller 14 determines whether the received acceleration is the predetermined acceleration caused by the first tap. When the received acceleration is the predetermined acceleration caused by the first tap, the sub-controller 14 notifies the main controller 12 accordingly (Notification (12)). Here, since the main controller 12 has already been activated, upon notification that the received acceleration is the predetermined acceleration caused by the first tap, the main controller 12 may immediately transmit the detection start request to the contact detector 30 (Detection start request (13)).

Here, since the contact detector 30 should detect the second touch thereafter, the main controller 12, after transmitting the Detection start request (13), erases the contact in the contact history recorded by the contact detector 30 (Record erasing (14)). Thereby, the contact detector 30 may notify the main controller 12 of a record of the last contact each time. Such control is carried out because, as described above, the contact detector 30, in operation and receiving the power supply, maintains the record of the contact history. Therefore, when the contact detector 30 is originally configured not to maintain the record of the contact in the contact history, there is no need to carry out the Record erasing (14). In FIG. 4, further, although the main controller 12 carries out the Record erasing (14) after transmitting the Detection start request (13) to the contact detector 30, these operations may be carried out in reverse order or simultaneously.

In FIG. 4, the main controller 12 transmits the Detection start request (13) and carries out the Record erasing (14), and then transmits the Detection end request (15). Here, the contact detector 30 may detect the second touch even when the time interval between the first tap (y) and the second touch (6) performed by the user is short. Since the contact detector 30 carries out the Record erasing (14) after receiving the Detection start request (13), the contact detector 30 records, with the contact history, a contact detected before the transmission of the Detection end request (15). According to the present embodiment, thereby, the contact detector 30 may detect the contact between the Record erasing (14) and the Detection end request (15) received from the main controller 12.

In FIG. 4, it is assumed that the user performs the second touch (6) between the Record erasing (14) and the Detection end request (15). Therefore, the contact detector 30 detects the contact caused by the second touch between the Record erasing (14) and the Detection end request (15). The main controller 12 receives, from the contact detector 30, a response that there is a record of the contact in the contact history (With record (16)).

The main controller 12, after the predetermined period B following the transmission of the Detection end request (15), determines whether the contact detector 30 has detected a contact. When a contact is not detected during the predetermined period B, the main controller 12 may determine that there is no touch that follows the second touch (δ).

When receiving the "With record (16)" from the contact detector 30, the main controller 12 controls the contact detector 30 to erase the record of the contact in the contact history (Record erasing (17)). Thereby, it may be determined whether there is a new contact during the next predetermined period B. In FIG. 4, the contact detector 30 does not detect a new contact during the predetermined period B. Therefore, the main controller 12 receives, from the contact detector 30, a response that there is no record of the contact in the contact history (No record (18)).

When receiving the response that there is no record of the contact from the contact detector 30, the main controller 12 determines that the second touch is performed within the predetermined period (the predetermined period A) from the first tap, that is, determines that the sequential operation is successfully performed, and activates the display 40 (ON (19)) such that the display 40 starts displaying the image.

According to the electronic apparatus 1 of the present embodiment, as described above, even when it is determined that the first sequential operation is not successfully performed and the display 40 remains disabled, the display 40 is activated when it is determined that a next sequential operation is successfully performed. According to the present embodiment, therefore, wasteful power consumption by activating the display 40 due to erroneous detection of the first tap may be reduced. According to the present embodiment, even after the determination as the erroneous detection, the user may enable the electronic apparatus 1 by performing the sequential operation.

In the embodiment as described above, the first tap is detected by the acceleration detector 50, and the second touch is detected by the contact detector 30. However, the second touch may be detected by the acceleration detector 50 together with the contact detector 30. That is, when the acceleration detector 50 detects the predetermined acceleration caused by the first tap and, within the predetermined period therefrom, detects predetermined acceleration caused by the second touch, the main controller 12 may control the display 40 to start displaying the image. The electronic apparatus 1, based on that the acceleration detector 50 detects the predetermined acceleration caused by the second touch and, also, the contact detector 30 detects the contact caused by the second touch, may activate the display 40.

In the above embodiment, the main controller 12, when no contact is detected during the predetermined period B after the transmission of the Detection end request (6), determines that a next touch following the second touch (β) is not performed. In FIG. 2, here, for example, when the next (third) touch is detected during the predetermined period B after the detection of the second touch (β) and no contact is detected during a predetermined period after the detection of the third touch, it may be determined that a next (fourth) touch is not performed. According to the present embodiment, as described above, a user operation to be detected is not limited to the sequential operation constituted of two consecutive touches but may be a sequential operation constituted of three or more consecutive touches.

In this case, according to the present embodiment, as described above, the controlling whether to erase the contact history recorded by the contact detector 30 allows the contact detector 30 to notify the main controller 12 of the record of the last contact each time. The electronic apparatus 1 of the present embodiment, accordingly, regardless of the number of consecutive touches being detected, may display the image in the display 40 based on the last touch.

According to the present embodiment, as described above, operations after the second touch may be detected by the acceleration detector 50 together with the contact detector 30.

In this case, in consideration of that the acceleration detector 50 detects the predetermined acceleration caused by the first tap and also detects the predetermined acceleration caused by the second touch, the main controller 12 may determine whether to activate the display 40. Operations after the second touch may be detected by the acceleration detector 50 in a similar manner. Further, when the acceleration detector 50 detects the predetermined acceleration caused by the tap and, within a predetermined period therefrom, does not detect the predetermined acceleration caused by the tap, it may be determined that the detected tap is the last touch. According to the present embodiment, therefore, when the acceleration detector 50 detects the predetermined acceleration caused by the second touch and, within the predetermined period therefrom, does not detect the predetermined acceleration, the main controller 12 may control the display 40 to start displaying the image.

As described above, in the electronic apparatus 1 according to the present embodiment, when the acceleration detector 50 detects the predetermined acceleration caused by the first tap and, within the predetermined period therefrom, the contact detector 30 detects the contact caused by the second touch, the display 40 may start displaying the image. However, the electronic apparatus 1 according to the present embodiment is not limited to the above embodiment. The electronic apparatus 1 according to the present embodiment may carry out, based on the detected tap, various operations in addition to controlling the display 40 to start displaying the image.

For example, when the contact detector 30 detects the contact caused by the second touch, the electronic apparatus 1 according to the present embodiment, based on the detected contact, may carry out various different operations. Here, "based on the detected contact" means, for example, based on at least one of various conditions including a contact position detected on the contact detector 30, a mode of the detected contact, and the number of detected contacts. The mode of the detected contact may be, for example, when the contact detector 30 detects the contact caused by the second touch, whether the detected contact is a simple tap, sliding, a flick, or the like. According to the present embodiment, based on the mode of the detected contact as described above, the main controller 12 may carry out different operations.

According to the present embodiment, the main controller 12 may detect the number of fingers used by the user in performing the contact detected by the contact detector 30. That is, when the contact detector 30 simultaneously detects contacts at a plurality of positions, based on a distribution of the positions of the detected contacts, the main controller 12 may estimate the number of user's fingers that performed the contact. Therefore, when the contact detector 30 detects the contact caused by the second touch, the electronic apparatus 1 according to the present embodiment may carry out different operations based on the number of user's fingers that performed the contact; one finger, two fingers, three fingers, or the like. When the operation based on various types of contacts as described above is carried out, the display 40 may as well display contents of the operation.

As described above, the sequential operation constituted of the two contacts is not the only sequential operation the electronic apparatus 1 of the present embodiment may detect. The electronic apparatus 1 of the present embodiment, therefore, may carry out different operations based on the number of times the acceleration detector 50 or the contact detector 30 detects the operation.

According to the present embodiment, as described above, when the acceleration detector 50 detects the predetermined acceleration caused by the first tap and, within the predetermined period therefrom, the contact detector 30 detects the contact caused by the second touch, the controllers (12 and 14) control to carry out the operation based on the detected contact. In this case, preferably, the controllers (12 and 14) control to carry out the operation based on at least one of the position, the mode, and the number of contacts detected by the contact detector 30. When the contact detector 30 simultaneously detects the contacts at a plurality of positions caused by the second touch, the controllers (12 and 14) may determine the number of the contacts and control to carry out the operation based on the number of the contacts. The controllers (12 and 14) may control to carry out the operation based on the number of times the acceleration detector 50 detects the predetermined acceleration.

According to the present embodiment, different controls carried out based on the various types of contacts as described above may include those described below.

For example, based on the various types of contacts detected by the contact detector 30, the main controller 12 may execute different application. For example, when the second touch is detected in a particular position in the contact detector 30, music player application is executed, and when the contact is detected in another position in the contact detector 30, e-mail application is executed. Also, for example, depending on the position where the second touch is detected as described above, different services for electronic money settlement may be performed. In this case, depending on the position where the second touch is detected, different application for different electronic money settlement is executed. According to the present embodiment, as described above, the controllers (12 and 14), based on the contact detected by the contact detector 30, may control to execute corresponding application software.

Or, based on the various types of the contacts detected by the contact detector 30, the main controller 12 may change an operation mode of the electronic apparatus 1. For example, when a normal touch is detected as the second touch by the contact detector 30, the main controller 12 may control the electronic apparatus 1 to operate in a normal mode. On the other hand, when the sliding or the flick is detected as the second touch by the contact detector 30, the main controller 12 may control the electronic apparatus 1 to operate in a silent mode. According to the present embodiment, as described above, the controllers (12 and 14), based on the contact detected by the contact detector 30, may control to change the operation mode of the electronic apparatus 1.

Or, based on the various types of the contacts detected by the contact detector 30, the main controller 12 may change a predetermined setting of the electronic apparatus 1. For example, when two consecutive taps (a double tap) is detected in the electronic apparatus 1 that is constituted by using the smartphone, reception sound volume for a phone call may be set to default standard volume. On the other hand, when three consecutive taps (a triple tap) is detected in the electronic apparatus 1, the reception sound volume for the phone call may be set to volume higher than the default standard volume. According to the present embodiment, as described above, the controllers (12 and 14), based on the contact detected by the contact detector 30, may control to change the predetermined setting of the electronic apparatus 1.

According to the present embodiment, the different control to be carried out based on the various types of the contacts as described above includes, for example, setting mode changing control, application execution control, device operation control, and the like. The setting mode changing control includes ringing mode changing control, communication mode changing control, and the like. The ringing mode changing control includes control to change to a speaker-sounding mode, a vibration mode, a speaker-sounding-with-vibration mode, a speaker-sounding-with-vibration restriction mode, and the like. The communication mode changing control includes control to change to data communication mode, an airplane mode, a tethering mode, and the like. The data communication mode changing control includes control to change to a communication mode that allows voice communication alone and a communication mode that allows data communication. The changing control to the airplane mode includes control to change to the airplane mode and control to cancel the airplane mode. The changing control to the tethering mode includes control to change to the tethering mode and control to cancel the tethering mode. The control to change to the tethering mode includes control to change to the tethering mode that uses Bluetooth and the tethering mode that uses Wi-Fi. The application execution control includes control to start or execute the application and control to execute a command of the application. The control to execute the command of the application includes control to execute checking a new message, checking updating, synchronizing operation of the application, and the like. The device operation control includes, for example, ON/OFF control of the Wi-Fi, ON/OFF control of the Bluetooth, and ON/OFF control of GPS.

According to the above embodiment, the predetermined period A from the detection of the first tap to the detection of the second touch may be appropriately determined based on the sequential operation that is generally performed. Also, the predetermined period A, preferably, may be changed as necessary based on user's preference after being once determined. Further, the predetermined period A may be determined based on timing of the sequential operation, which is usually performed by the user actually operating the electronic apparatus, learned by the electronic apparatus 1. In this case, the electronic apparatus 1 may request the user to perform the sequential operation by way of trial and, based on the sequential operation performed by the user, the controllers (12 and 14) may learn the timing of the sequential operation. Or, without requesting the user to perform the sequential operation by way of trial, based on the sequential operation usually performed by the user, the controllers (12 and 14) may learn the timing of the sequential operation. That is, the controllers (12 and 14) may determine the predetermined period based on the predetermined acceleration caused by the sequential operation detected by the acceleration detector 50, or based on a time interval of the contacts caused by the sequential operation detected by the contact detector 30. For example, in a case where the operation for cancelling the restriction of the operations is requested after the display 40 starts displaying the image, when the operation for cancelling the restriction of the operations is received, the timing of the sequential operation that causes the display 40 to start displaying the image may be learned. Thereby, the electronic apparatus 1 may learn the timing of the sequential operation without requesting the user to perform a specific operation.

According to the embodiment as described above, the predetermined period B for determining that a next tap or a next touch is not detected after the transmission of the detection end request to the contact detector 30 from the main controller 12 may also be appropriately determined based on the user operation usually performed. Also, in a manner similar to that as described above, the predetermined period B, preferably, may be changed as necessary based on the user's preference after being once determined. Further, for the predetermined period B, the electronic apparatus 1 may learn the timing of the operation usually performed by the user actually operating the electronic apparatus 1.

In the above embodiment, further, the predetermined period A and the predetermined period B may have respective periods of time those either the same for the detection of any number of the tap, or different for the detection of each number of the tap.

According to the present embodiment, when the electronic apparatus 1 is enabled by detecting the sequential operation and then requests the operation for cancelling the restriction of the operation, it means that the user is requested to perform an additional operation. According to the present embodiment, therefore, upon detection of the sequential operation, the electronic apparatus 1 is enabled and, simultaneously, the restriction of the operations may be cancelled. Thereby, it may preferably save the user of the trouble of performing the additional operation. According to the present embodiment, that is, when the contact detector 30 detects the contact caused by the second touch, the controllers (12 and 14) may control the display 40 to start displaying the image and, further, control to cancel the disabling of an input to the electronic apparatus 1.

After the display 40 starts displaying the image as described above, when the operation to cancel the restriction of the operations is requested, a specific gesture operation by a finger contacted for the second touch may be requested as the operation to cancel the restriction of the operations. Thereby, the electronic apparatus 1 may offer a new function while reducing the trouble of the user. For example, the electronic apparatus 1 may request a plurality of gestures as the gesture operation for cancelling the restriction of the operations. The electronic apparatus 1, by requesting different gesture operations for different applications, may cancel the restriction of the operations and, further, activate each application corresponding to each gesture operation.

Although the electronic apparatus 1 according to the present embodiment has been described, the disclosure herein may be implemented by a control method of the electronic apparatus 1 as described above. Further, the disclosure herein may be implemented by a control program of the electronic apparatus 1 as described above.

Although the disclosure has been described based on the figures and the embodiment, it is to be understood that various changes and modifications may be implemented based on the present disclosure by those who are ordinarily skilled in the art. Accordingly, such changes and modifications are included in the scope of the disclosure herein. For example, functions and the like included in each unit, each means, each step and the like may be rearranged without logical inconsistency, so as to combine a plurality of units or steps together or to divide them. Also, the above embodiment as described above is not intended to be carried out strictly but may be carried out by combining features. In particular, the operations of the present embodiment described with reference to FIGS. 2 to 4 are illustrated by way of example only and, as long as following the spirit of the disclosure herein, various other operations may be assumed.

Many aspects of the disclosure herein may be represented by a series of operations executed by a computer system or other hardware those are capable of executing a program instruction. The computer system or the other hardware include, for example, a general-purpose computer, a PC (personal computer), a special purpose computer, a workstation, PCS (Personal Communications System; a personal mobile communication system), a mobile (cellular) phone, a mobile phone having a data processing function, an RFID receiver, a game machine, an electronic notepad, a laptop computer, a GPS (Global Positioning System) receiver, and other programmable data processing apparatuses. Note that in the embodiment the various operations are executed by a dedicated circuit implemented with a program instruction (software) (e.g., discrete logic gates interconnected to perform a specific function), or a logical block, a program module and the like executed by at least one processor. The at least one processor for executing the logical block, the program module and the like includes, for example, at least one microprocessor, CPU (Central Processing Unit), ASIC (Application Specific Integrated Circuit), DSP (Digital Signal Processor), PLD (Programmable Logic Device), FPGA (Field Programmable Gate Array), a processor, a controller, a microcontroller, a microprocessor, an electronic apparatus, and other apparatuses designed to be capable of executing the functions described herein, and/or a combination thereof. The embodiment presented herein is implemented by, for example, hardware, software, firmware, middleware, a microcode, or any combination thereof. The instruction may be a program code or a code segment for executing a necessary task. The instruction may be stored in a machine-readable non-transitory storage medium or in another medium. The code segment may represent any combination of a procedure, a function, a subprogram, a program, a routine, a subroutine, a module, a software package, a class or an instruction, and a date structure or a program statement. The code segment, with another code segment or a hardware circuit, transmits/receives information, a data argument, a variable, and memory contents. Thereby, the code segment is connected to the another code segment or the hardware circuit.

Also, the machine-readable non-transitory storage medium may be constituted by using a solid state memory or a tangible carrier (medium) readable by the computer such as a magnetic disk and an optical disk, and stores an appropriate set of computer instructions such as program modules and a data structure those for making the processor to execute the technique disclosed herein. The computer-readable medium includes an electric connection with at least one wiring, a magnetic disk storage media, a magnetic cassette, a magnetic tape, other magnetic and optical storage devices (e.g., CD (Compact Disk), a laser disk (registered trademark), DVD (Digital Versatile Disc), a floppy (registered trademark) disk, and a Blu-ray disc), a portable computer disk, RAM (Random Access Memory), ROM (Read-Only Memory), a ROM such as an EPROM, an EEPROM, or a flash memory that is rewritable and programmable, other tangible storage media capable of storing information, or any combination thereof. The memory may be provided inside and/or outside the processor/processing unit. Here, the term "memory" means all types of a long-term memory, a short-term memory, a volatile memory, a non-volatile memory, and other memories. A type of the memory, the number of memories, and a type of the medium to store the information are not limited.

Note that the system disclosed herein includes various modules and/or units for executing specific functions, and the modules and/or the units are schematically illustrated for the purpose of brief description of functionality thereof and do not necessarily represent specific hardware and/or software. In that sense, these modules, units, and other components may be any hardware and/or software implemented to substantially execute the specific functions described herein. Various functions of different components may be substantialized by combining or separating the hardware and/or the software in any manner, and may be used separately or in any combination. Further, an input/output or I/O device and a user interface may be a keyboard, a display, a touch screen, a pointing device, and the like but not limited thereto, and may be connected to the system directly, or via an I/O controller that intervenes. As described above, various aspects of the disclosure herein may be implemented in various embodiments, and all the various embodiments are included in the scope of the disclosure herein.

REFERENCE SIGNS LIST 1 electronic apparatus
12 main controller
14 sub-controller
20 memory
30 contact detector
40 display
50 acceleration detector
60 environmental condition detector

The invention claimed is:

1. An electronic apparatus, comprising:
a touch sensor configured to detect a contact;
an acceleration detector configured to detect acceleration;
a display configured to display an image; and
a controller configured to, in a state where the display is inactive,
when
(i) the acceleration detector detects predetermined acceleration caused by a first tap, and
(ii) within a predetermined period from the detection of the predetermined acceleration by the acceleration detector, the touch sensor is activated and detects a contact caused by a second touch,
activate the display to start displaying the image and carry out an operation based on the detected contact caused by the second touch,
wherein the controller is configured to
receive a record of the contact in response to the detection of the contact caused by the second touch,
erase the record of the contact, and
determine whether a further contact is detected by the touch sensor during a further predetermined period after the predetermined period.

2. The electronic apparatus according to claim 1, wherein the controller, based on the contact, is configured to execute corresponding application software.

3. The electronic apparatus according to claim 1, wherein the controller, based on the contact, is configured to change an operation mode of the electronic apparatus.

4. The electronic apparatus according to claim 1, wherein the controller, based on the contact, is configured to change a predetermined setting of the electronic apparatus.

5. The electronic apparatus according to claim 1, wherein the controller is configured to carry out an operation based on at least one of a position, a mode, and the number of contacts.

6. The electronic apparatus according to claim 1, wherein the controller, when the touch sensor simultaneously detects contacts at a plurality of positions caused by the second touch, is configured to
determine the number of the contacts, and
carry out an operation based on the number of the contacts.

7. The electronic apparatus according to claim 1, wherein the controller is configured to carry out an operation based on the number of times the acceleration detector detects the predetermined acceleration.

8. A method of controlling an electronic apparatus having a touch sensor for detecting a contact, an acceleration detector for detecting acceleration, and a display for displaying an image, said method comprising:
a contact detection step of detecting a contact by the touch sensor;
an acceleration detection step of detecting acceleration by the acceleration detector;
a display step of displaying an image by the display; and
a control step of,
when
(i) predetermined acceleration caused by a first tap is detected at the acceleration detection step, and
(ii) within a predetermined period from the detection of the predetermined acceleration by the acceleration detector, the touch sensor is activated and detects a contact caused by a second touch at the contact detection step,
carrying out an operation based on the detected contact caused by the second touch,
wherein the control step further includes
receiving a record of the contact in response to the detection of the contact caused by the second touch,
erasing the record of the contact, and
determining whether a further contact is detected by the touch sensor during a further predetermined period after the predetermined period.

9. A non-transitory storage medium storing a control program for causing an electronic apparatus having a touch sensor for detecting a contact, an acceleration detector for detecting acceleration, and a display for displaying an image to execute a contact detection step of detecting a contact by the touch sensor;
an acceleration detection step of detecting acceleration by the acceleration detector;
a display step of displaying an image by the display; and
a control step of, in a state where the display is inactive,
when
(i) the acceleration detector detects predetermined acceleration caused by a first tap, and
(ii) within a predetermined period from the detection of the predetermined acceleration by the acceleration detector, the touch sensor is activated and detects a contact caused by a second touch,
activating the display to start displaying the image and carrying out an operation based on the detected contact caused by the second touch,
wherein the control step further includes
receiving a record of the contact in response to the detection of the contact caused by the second touch,
erasing the record of the contact, and determining whether a further contact is detected by the touch sensor during a further predetermined period after the predetermined period.

10. The electronic apparatus according to claim 1, further comprising a main controller configured to control the acceleration detector,
wherein the touch sensor is configured to receive no power before activation of the main controller in response to the acceleration detector detecting the predetermined acceleration caused by the first tap.

11. The electronic apparatus according to claim 1, wherein the controller is configured to,
when (i) the acceleration detector detects the predetermined acceleration caused by the first tap, and (ii) within the predetermined period from the detection of the predetermined acceleration by the acceleration detector, the touch sensor is activated and detects the contact caused by the second touch and a type of the second touch,
carry out an operation based on the detected contact caused by the second touch.

12. The electronic apparatus according to claim 1, wherein the controller is configured to carry out the operation based on the contact in response to a final touch regardless of number of touches.

* * * * *